Dec. 4, 1962  C. A. ZINN  3,066,454
MECHANICAL DEVICE

Filed Aug. 29, 1960  2 Sheets-Sheet 1

INVENTOR.
CLARENCE A. ZINN
BY
Woodham Blanchard and F. Lynn
ATTORNEYS

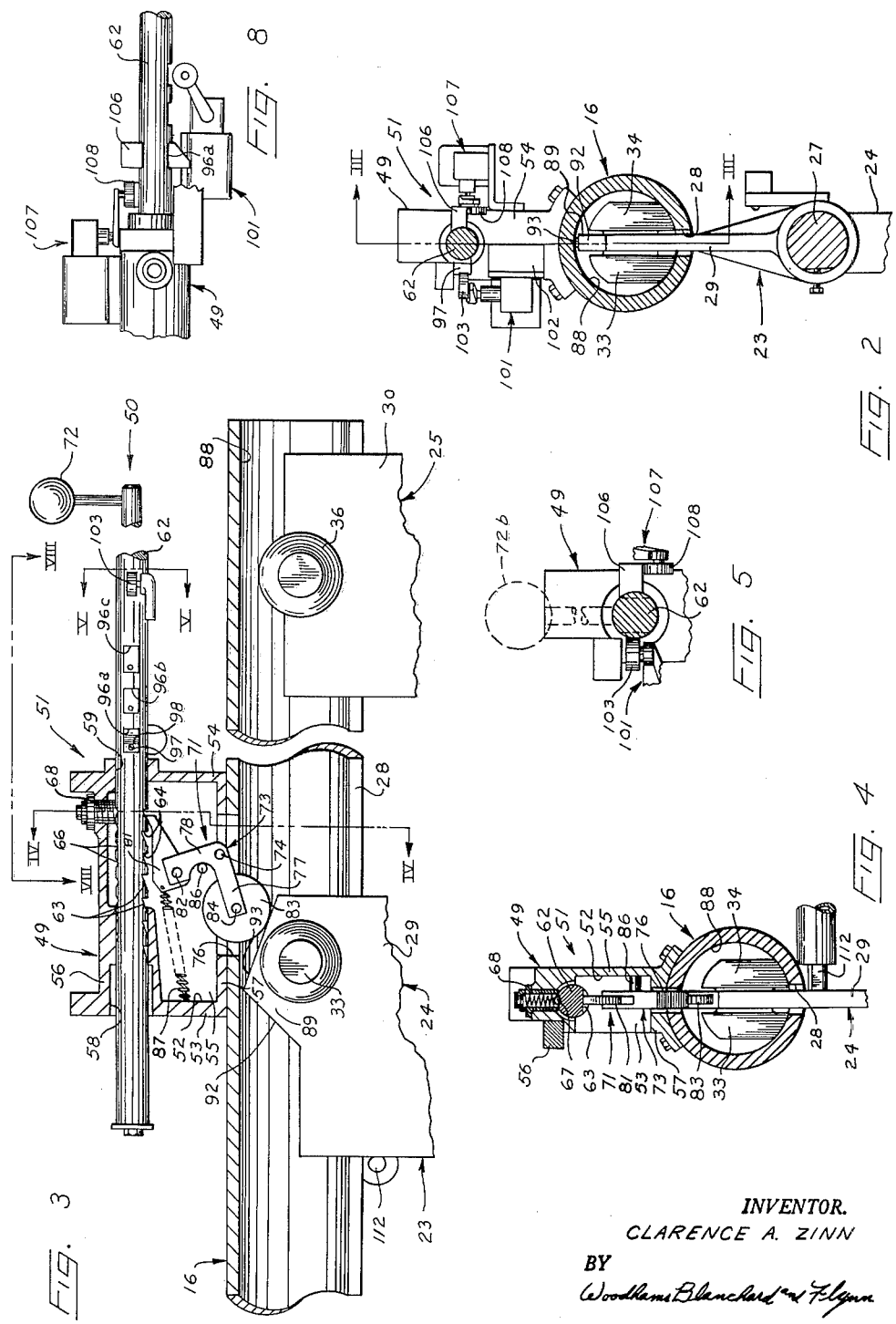

3,066,454
MECHANICAL DEVICE
Clarence A. Zinn, Kalamazoo, Mich., assignor to Hammond Machinery Builders, Inc., Kalamazoo, Mich., a corporation of Michigan
Filed Aug. 29, 1960, Ser. No. 52,500
10 Claims. (Cl. 51—144)

This invention relates in general to a counting and/or cycling mechanism for a machine having a workpiece-supporting carriage reciprocably movable along a predetermined path and, more particularly, to such a mechanism which is capable of monitoring the movement of the carriage along said path and automatically terminating such movement after a selected number of reciprocations has occurred.

Certain types of metal working operations, such as grinding or polishing, are performed upon elongated workpieces by moving the workpiece along its lengthwise axis adjacent to the working head of a metal working machine. By way of illustration, the machine may be a belt type, centerless grinder having a pair of spaced and opposed belts between which the workpiece is placed. Such a machine may, for example, be utilized to finish and/or polish a shaft, particularly where dimensional accuracy is important. However, specific reference to such a machine is intended only to facilitate the disclosure of the invention and not to limit its scope.

In a typical machine of this type the workpiece may be supported upon a carriage which is mounted upon a rail for substantially horizontal movement lengthwise of the workpiece. It is common practice to mount one of the belts angularly so that its operation also effects the lengthwise advancement of the workpiece and carriage. More specifically, one of the belts is mounted so that its plane of operation can be tilted around a horizontal axis perpendicular to both the plane of the working surface of the belt and the lengthwise axis of the workpiece. Thus, the direction of movement of the carriage and workpiece depends upon the direction in which such belt is tilted. The direction of tilt, hence the direction of movement of the carriage, may be automatically reversed by suitable switches. The correct amount of grinding or polishing by said belt, particularly under production conditions, is usually in part determined by the number of lengthwise reciprocations or cycles of the carriage along the rail. Hence, an accurate count of such reciprocations is required.

While many types of control mechanisms have been developed for similar purposes in the past, none of them in so far as I am aware has been suitable for the service required here. Having in mind that a grinding and polishing operation is often the finishing operation on a large and heavy part, such as a shaft on which there has already been expended a great amount of labor time, a mal-functioning for even a few seconds of the control mechanism for the grinder or polisher used on such part could completely ruin same and thereby result in a loss of many hundreds or even thousands of dollars. Therefore, in the past it has often been considered essential to have an operator in constant attendance on the machine in order to maintain constant manual control over its operation. However, this is expensive and even under the circumstances involved here, manual control is not always sufficiently accurate.

Therefore, it has for a long time been desirable to provide automatic control equipment for a machine of this general type which is sufficiently accurate and trust-worthy to warrant entrusting to it the control over the finish grinding of expensive elongated articles, such as shafts.

However, in order to have a machine of sufficient versatility to be economically useful in more than a few limited situations, it is esential to have a machine which can be readily adjusted for various numbers of reciprocations of its carriage to adapt it for various types of jobs as the need may develop from time to time. This requires a counting mechanism and, in making same adjustable, inaccuracies are often introduced into such mechanism which in a machine of the present type cannot be tolerated. Moreover, previously known counting mechanisms, which are of sufficient accuracy to be reliable, are often so difficult to adjust for various operating intervals that they are of no net value and operators often prefer to control an operation manually instead of manipulating and adjusting a relatively complex automatic counting mechanism.

Accordingly, a primary object of this invention has been the provision of a counting mechanism for a metal working machine having a workpiece-supporting carriage reciprocable along a predetermined path, whereby the number of movements of said carriage, hence of the workpiece, along said path can be accurately and positively preselected and whereby the metal working operation of the machine will be terminated when a selected number of reciprocations has been completed.

A further object of this invention has been the provision of a counting mechanism, as aforesaid, which is positive and foolproof in operation, which can be easily and quickly adjusted for various counts, which can be easily and quickly reset after a counting operation, which serves to both start and stop the drive means effecting movement of the carriage, and which has a minimum of moving parts and, therefore, requires a minimum of maintenance.

A further object of this invention has been the provision of a counting mechanism, as aforesaid, which is sturdy in construction and which can be easily adapted to any metal working machine of the type wherein a workpiece is supported for reciprocating movement along a horizontal path.

Other objects and purposes of this invention will become apparent to persons familiar with this type of equipment upon reading the following specification and examining the accompanying drawings, in which:

FIGURE 2 is a sectional view taken along the line II—II in FIGURE 1.

FIGURE 3 is a sectional view taken along the line III—III in FIGURE 2.

FIGURE 4 is a sectional view taken along the line IV—IV in FIGURE 3.

FIGURE 5 is a sectional view taken along the line V—V in FIGURE 3.

FIGURE 8 is a fragment of FIGURE 3 indicated by the cutting line VIII—VIII.

Figure 1:
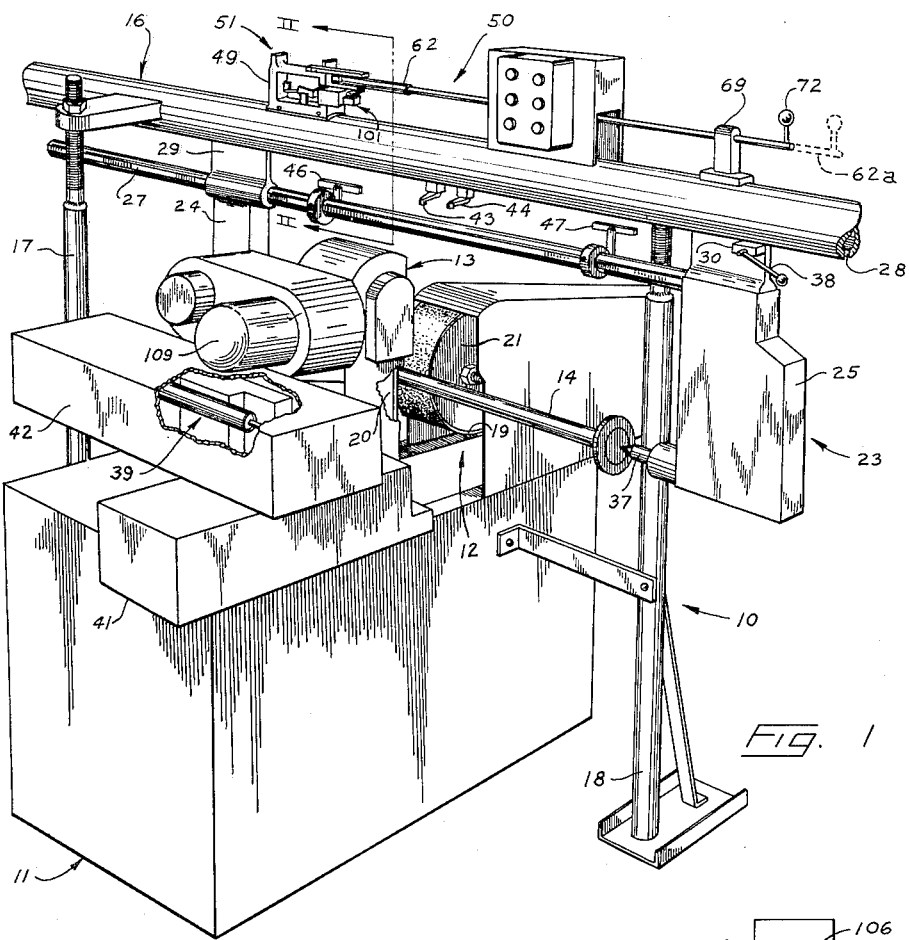
FIGURE 1 is a broken, perspective view of a grinding machine equipped with a counting mechanism embodying the invention.

For convenience in description, the terms "upper," "lower," "front," "rear," "left," "right" and derivatives thereof will have reference to the counting mechanism of the invention, as appearing in FIGURE 3, and the metal working machine with which it is associated in its normal position of operation as appearing in FIGURE 1. The terms "inner," "outer" and derivatives thereof will have reference to the geometric center of said counting mechanism and the machine associated therewith.

General Description

The objects and purposes of the invention, including those set forth above, have been met by providing a counting mechanism which is mounted in a fixed position with respect to a metal working machine having a workpiece-supporting carriage movable along a path adjacent to the counting mechanism. The counting mechanism is comprised of a counting head which, in a preferred embodiment of the invention, is mounted upon a rail which supports the carriage. An elongated rod is supported upon the counting head and upon the rail in a position spaced from and parallel with said rail. The rod is movable with respect to the housing head both lengthwise of, and around, the lengthwise axis of the rod. Actuating mechanism is mounted upon the counting head for effecting step-by-step lengthwise advancement of the rod in one direction with respect to the counting head in response to pre-selected movements, usually reciprocations, of the carriage along the rail. The rod is manually rotated around and moved along its lengthwise axis in the opposite direction for the purpose of resetting the counting mechanism and, at the same time, initiating another counting operation.

Detailed Construction

The grinding machine 10 (FIGURE 1), which has been selected to illustrate one type of machine with which the invention can be utilized, is comprised of a base frame 11 supporting a pair of conventional, belt-type grinding heads 12 and 13 which have belts 19 and 20, respectively, each belt being rotatably supported upon and between a pair of spaced pulleys such as the pulley 21, having substantially horizontal axes. The rear grinding head 12 may be arranged for adjustment toward and away from the front grinding head 13, and the reaches of its belt 19 are substantially horizontal. The belt 20 on the front grinding head 13 has substantially vertical reaches and said head 13 is supported upon means within the casing 42 for pivotal movement around a horizontal axis substantially perpendicular to the reaches of the belt 19. Accordingly, the reaches of the belt 20 on the grinding head 13 can be tilted sidewardly in either direction while remaining substantially within the same vertical planes for the purpose of moving an elongated workpiece 14 axially therebetween in a presently known manner. The front grinding head 13 is preferably supported upon the base frame 11 for movement toward and away from the rear grinding head 12, as described hereinafter.

A hollow, cylindrical rail 16 (FIGURE 1) is mounted upon posts, including those appearing at 17 and 18, which are anchored with respect to the base frame 11. The rail 16 is preferably located directly above the space between the opposing surfaces of the belts 19 and 20 on the grinding heads 12 and 13. A carriage 23 includes a pair of spaced end members 24 and 25 which are suspended from the rail 16 for movement lengthwise thereof and secured to the opposite ends of a substantially horizontal connecting bar 27 located below, and parallel with, said rail 16.

The rail 16 has a lengthwise slot 28 (FIGURE 1) in its lower wall through which the upper ends 29 and 30 of the end members 24 and 25, respectively, are slidably received. A pair of coaxial rollers 33 and 34 (FIGURE 2) are mounted upon the opposite sides of the upper end 29 of the support member 24 for engagement with the inside surface of the lower wall of the rail 16 adjacent to the slot 28. Thus, the support member 24 is suspended from the rail 16 in a substantially upright position for movement lengthwise of the rail 16 by the rollers 33 and 34. A similar pair of rollers, one of which is shown at 36 in FIGURE 3, is mounted upon the upper end 30 of the support member 25 for suspending said member 25 in an upright position from the rail 16. Workpiece-engaging members, such as the tail stock 37 (FIGURE 1), are supported upon the opposing sides of the support members 24 and 25 for the purpose of engaging and holding a workpiece, such as the cylindrical shaft 14. A manually releasable lock mechanism 38 is mounted upon the upper end 30 of the support member 25 for engagement with a latch (not shown) on the rail 16 to hold the carriage 23 in its fully rightward position when a workpiece 14 is being loaded in or unloaded from said carriage.

Electrically energized and controlled pivot mechanism 39 (FIGURE 1), is disposed within the upper casing 42 for effecting pivotal movement of the front grinding head 13 around its pivot axis which is preferably horizontal and perpendicular to the shaft 14. The upper casing 42 is mounted upon a lower casing 41 which is in turn supported upon the base frame 11 for reciprocable movement toward and away from the workpiece 14. Limit switches 43 and 44, which control the pivot mechanism, are mounted upon the rail 16 and engageable by switch actuators 46 and 47, respectively, which are adjustably supported upon the connection bar 27. Engagement of the switch 43 by the actuator 46 occurs, for example, when the carriage 23 approaches the rightward end of its controlled traverse along the rail 16, thereby causing the upper end of the grinding head 13 to be pivoted leftwardly whereby the carriage is moved leftwardly in a well-known manner. Engagement of the switch 44 by the actuator 47 at the leftward end of the carriage traverse pivots the head 13 rightwardly and starts rightward movement of the carriage. The above-described structure of an open-center grinding machine 10 is herein set forth in detail to illustrate one type of machine with which applicant's counting mechanism 50 may be utilized.

The counting mechanism 50 (FIGURES 1 and 3) includes a counting head 51 which is mounted upon the rail 16 between the rail-supporting posts 17 and 18. The counting head includes a housing 49 having a central, substantially rectangular chamber 52 defined at least in part by the end walls 53 and 54, a back wall 55 (FIGURE 4) a top wall 56 and a bottom wall 57 which rests upon the upper surface of the rail 16. The end walls 53 and 54 have coaxial openings 58 and 59, preferably adjacent to the top wall 56, through which the left end portion of an elongated counting rod 62 is slidably disposed so that its axis is parallel with the central axis of the rail 16.

The left end of the rod 62 (FIGURE 3), which is disposed adjacent to the chamber 52, has a plurality of adjacent notches 63 aligned lengthwise of said rod and spaced at uniform intervals along said rod. The rightward end of each notch 63 is defined by a small wall 64 which is substantially perpendicular to the lengthwise extent of the rod 62 for reasons appearing hereinafter. The counting rod 62 has a plurality of detent recesses 66 aligned lengthwise of the upper surface of the rod and uniformly spaced at intervals equal to the spacing between adjacent walls 64 of the notches 63. A spring-backed detent ball 67 is disposed within the detent cylinder 68 which is mounted in the top wall 56 of the housing 49. The detent ball 67 is receivable into the detent recesses 66, one at a time, for releasably resisting lengthwise and/or rotational movement of the counting rods 62 with respect to the counting head 51. The detent ball also cooperates with the recesses 66 to properly position the rod 62 at the end of each advancement thereof during a counting operation. The rightward end of the counting rod 62 is slidably and rotatably engaged by the upright support bracket 69, which is mounted upon the rail 16. A manually engageable handle 72 is secured to the rightward end of the counting rod 62 for the purpose of moving the rod 62 both lengthwise of and around the lengthwise axis thereof.

The rod 62 (FIGURE 3) can also be moved in a lengthwise direction by actuating mechanism 71, most of which is located within the chamber 52. Said actuating mechanism 71 includes the bell crank 73 which is pivotally supported upon the housing 49 within the chamber 52 by means of a substantially horizontal pivot pin 74 which is transverse of the lengthwise axis of the rail 16. A slot 76 through the bottom wall 57 and the adjacent portion of the rail 16 communicates between the chamber 52 and the interior 88 of the rail 16 into which the horizontal arm 77 of the bell crank 73 is extendable. Both the horizontal arm 77 and the vertical arm 78 of the bell crank 73 are forked at their outer ends. A lever 81 is pivotally supported between its ends within the fork in the vertical arm 78 by means of the pin 82, which is axially parallel with the pivot pin 74. A roller 83 is rotatably supported within the fork of the horizontal arm 77 by means of the pin 84, which is axially parallel with the pivot pin 74.

A limit pin 86 (FIGURE 3) is secured to, and extends frontwardly from, the back wall 55 of the housing 49 to limit rotation of the bell crank 73 in a counterclockwise direction. A spiral spring 87 is connected at its opposite ends to, and extends between, the end wall 53 of the housing 49 and the leftward end of the lever 81. Accordingly, the vertical arm 78 of the bell crank 73 is continuously urged by the spring 87 against the limit pin 86, whereby the roller 83 on the horizontal arm 77 extends through the slot 76 into the interior 88 of the rail 16 and is normally in the position shown in FIGURE 3. The spring 87 is secured to the lever 81 at a point leftwardly of and above the pin 82 when the rightward end of the lever 81 is in engagement with the counting rod 62. Accordingly, the rightward end of the lever 81 is continuously urged upwardly against the counting rod 62, hence into that one of the notches 63 which is at a given time adjacent to the rightward end of the lever 81.

The upper end portion 29 of the support member 24 (FIGURE 3) has an upwardly extending, integral cam 89 with a cam surface 92 along its upper edge which slopes downwardly and both leftwardly and rightwardly from a high point 93 about midway between the ends of the cam surface 92. The cam 89 is arranged for engagement with the periphery of the roller 83 whereby said bell crank 73 is pivoted from a position as appearing in FIGURE 3 to a position as appearing in FIGURE 6 and back, whenever the support member 24 moves past the roller 83 in either direction. In this embodiment, the switch 43 and switch actuator 46 are preferably positioned so that the roller 83 rides up the right side of the cam surface 92 and reaches the high point 93 substantially at, but not later than, the moment when the actuator 46 operates the switch 43. The resultant pivotal movement of the bell crank 73 causes the rightward end of the lever 81 which is engaged with a notch 63 to move rightwardly, and thus move the rod 62 rightwardly a distance which is greater than the distance between the end walls 64 of the two adjacent notches 63 in the rod 62 but which is less than twice the distance between two adjacent end walls 64.

Figure 6:
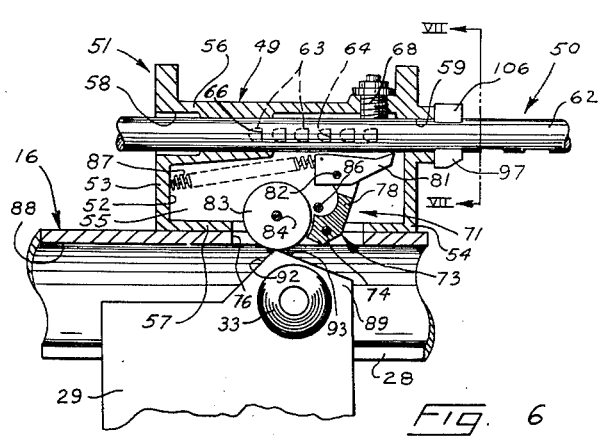
FIGURE 6 is a fragment of FIGURE 3 showing the counting mechanism in a different position of operation.

The counting rod 62 (FIGURE 3) has along the front side thereof a plurality, here three, of uniformly spaced stop block recessesses 96, which are all disposed outside of the housing 49 when the rod 62 is in its leftwardmost position, as in FIGURE 6. A stop block 97 is mountable by means of the screw 98 within any one of the recesses 96. In this embodiment, the distance from a point on the stop block 97 when it is located in one recess 96 to the same point on the block 97 when it is located in the next adjacent recess 96 is preferably equal to twice the distance between a pair of adjacent end walls 64 in said rod 62. A limit switch 101 (FIGURE 2) is supported by means of the bracket 102 upon the outer surface of the end wall 54 so that its roller 103 is engageable by the stop block 97 when said block is located within any one of the stop block recesses 96.

A starting block 106 is mounted upon the rear side (FIGURES 5 and 8) of the rod 62 at a point diametrically opposite the leftwardmost stop block recess 96. A starting switch 107 is supported upon the housing 49 so that its roller 108 is engaged by the starting block 106 whenever the rod 62 is in its leftwardmost or initial position and the handle 72 is in an upright position, as appearing in FIGURE 1. The stop switch 101 (FIGURE 8) and starting switch 107 are electrically connected to drive means located in the lower casing 41 whereby the grinding head 13 is caused to move with the upper casing 42 toward and away from the grinding head 12. Operation of the starting switch 107 moves the head 13 toward the workpiece and operation of the stop switch 101 moves the head 13 away from the workpiece. The belt 20 is continuously moved by the motor 109.

A carriage positioner 112 (FIGURE 3), which may be an air operated plunger, is adjustably suported upon the rail 16 for selectively engaging the left edge of the support member 24 and thereby obstructing leftward movement of the carriage 23. When the member 24 engages the carriage positioner 112, the cam 89 is adjacent to, and leftwardly of, the roller 83, and the carriage is in its initial position for one or more cycles of operation.

*Operation*

Where the counting mechanism 50 of the invention (FIGURE 1) is utilized with a centerless grinding machine 10, a workpiece, such as a shaft 14, is mounted upon and between the support members 24 and 25 by means including the tail stock 37 so that said shaft is parallel with the rotational axes of the grinding heads 12 and 13. Usually, the carriage 23 will be held by the lock mechanism 38 at the extreme rightward end of its path of movement and the grinding head 13 will be moved away from the head 12 when the workpiece is loaded on the carriage 23 and the following discussion will assume such an arrangement.

The counting rod 62 will normally be in its broken line position 62a of FIGURE 1, where it stopped its rightward movement at the end of its last counting operation. The lock mechanism 38 is now released and the carriage 23 is moved leftwardly (FIGURE 3) until the support member 24 engages the positioning plunger 112 and this constitutes the leftward limit of its traverse. Although the cam 89 engages the roller 83 during such movement, which advances the rod 62 rightwardly another step, nothing else occurs because the head 13 has been backed away from the head 12 and will not be moved toward it until switch 107 is operated. Under normal circumstances, the reaches of the belt 20 on the front grinding head 13 will be inclined slightly from the vertical in one direction or the other. In this embodiment, the belt 20 will be tilted rightwardly because the reach thereof adjacent the workpiece moves upwardly and the counting mechanism 50 is set up for initial rightward movement of the carriage 23.

The stop block 97 is secured by means of the screw 98 within the one of the stop block recesses 96 which will produce the proper number of cycles or traverses of the carriage 23 along the rail 16 in accordance with the requirements of the grinding operation to be performed upon the shaft 14. Placement of the stop block 97 in the first stop block recess 96a will permit three cycles of movement of the carriage or six complete traverses (three in each direction) along the rail 16. Placement of the stop block 97 in the recess 96b will produce four traverses or two cycles and placing the block 97 in recess 96c will produce one cycle or two traverses of movement. Obviously, other arrangements can be provided by appropriate location of the stop block recesses 96 and the block 97 associated therewith. If, as shown in FIGURE 3, the stop block 97 is placed in recess 96a, then it will be diametrically opposite the starting block 106 in this embodiment.

Figure 7:
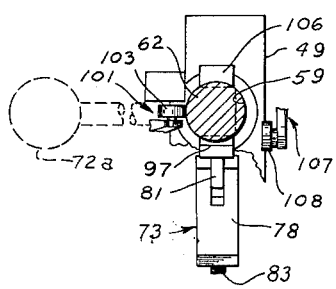
FIGURE 7 is a sectional view taken along the line VII—VII in FIGURE 6.

To commence a grinding or other operation, the handle 72 on the counting rod 62 is grasped and rotated into its broken line position 72a of FIGURE 7. The rod 62 is then moved leftwardly until it is in its FIGURE 6 position where both the stop block 97 and starting block 106 will be adjacent to the right end wall 54 and the lever 81 will be engaging the unbroken surface on the rod 62 midway between the line of notches 63 and the line of detent recesses 66, so that said lever 81 will not interfere with the leftward or cocking movement of the rod 62. Moreover, the starting block 106 will be on the top side of the rod 62, as appearing in FIGURE 7, where it cannot engage the roller 108 on the starting switch 107 during the cocking movement.

When it becomes desirable to commence the grinding or other operation upon the workpiece, here the shaft 14, the rod 62 is rotated in a clockwise direction, as appearing in FIGURE 7, by moving the handle 72a into the 72b position of FIGURE 5. This causes the starting block 106 to engage the roller 108 on the switch 107 whereby the drive means in the lower casing 41 is energized and causes the head 13 to move toward the head 12 until the shaft 14 is engaged between and by the belts 19 and 20. As the shaft 14 is ground by the belts 19 and 20, the rightward tilt of the belt 20 will cause the shaft 14, hence the carriage 23, to move in a rightward direction along the rail 16 in a presently well known manner. Immediately following the commencement of such movement, the cam surface 92 (FIGURE 3) will engage the roller 83, thereby causing the bell crank 73 to rotate into its FIGURE 6 position and, by means of the lever 81, effect a rightward movement of the rod 62 equal to the distance between two adjacent end walls 64 of the notches 63. As the cam 89 continues past the roller 83, the crank 73 will move from its FIGURE 6 position back to its FIGURE 3 position and thereby cock the counting mechanism in preparation for its next actuation. That is, the lever 81 will be moved from the rightwardmost notch 63 into the next leftward notch adjacent thereto.

The switch actuator 46 is so positioned with respect to the cam 89 that the limit switch 43 will be operated by the actuator 46 after the carriage 23 has moved rightwardly from its FIGURE 3 position a distance determined by the relative positions of the switch 43 and the actuator 46, which will depend upon the length of the working surface on the workpiece 14. When the switch 43 is operated, the tilt of the belt 20 will be reversed in any convenient and already known manner, thereby causing the carriage 23 to be moved leftwardly, as appearing in FIGURE 1. Upon substantial completion of such leftward movement the cam 89 again passes the bell crank 73 and the roller 83 thereon is again engaged by the cam surface 92 whereby the lever is moved first rightwardly to advance the rod 62 and then again leftwardly into the cocked position in the third notch 63 from the right.

The carriage will continue to move leftwardly until the switch actuator 47 engages the limit switch 44 whereby the tilt of the grinding head 13 is again reversed, and the carriage again moves rightwardly. During such rightward movement the cam 89 again engages the roller 83 whereby the first cycle of operation or carriage movement is completed. The engagement of the roller 83 by the cam 89 at this point again rotates the bell crank 73 whereby the rod 62 is advanced rightwardly.

If the counting mechanism is set for one cycle of operation, the stop block 97 will have been placed in the stop block recess 96c (FIGURE 3) and the third rightward advancement of the rod 62, which has just occurred, will at this point cause said stop block 97 to engage the roller 103 on the stop switch 101, thereby moving the head 13 away from the workpiece 14 and indicating to the operator that the grinding operation has been completed. However, in the particular arrangement shown in the drawings, the block 97 is located in the stop block recess 96a. Accordingly, two more complete cycles of movement of the carriage 23, each cycle being identical with the above-described cycle, must be completed before the stop switch 101 is operated by the stop block 97. That is, in each of the two remaining cycles, the carriage 23 must first complete its rightward movement, then move leftwardly a full stroke followed by a rightward movement to the point of engagement between the roller 83 with the cam 89. At the end of this traversing sequence, the grinding operation 10 is automatically terminated by the retracting movement of the head 13, and the counting rod 62 will be in its broken line position 62a of FIGURE 1.

In order to perform a polishing or grinding operation on another workpiece, the counting mechanism 50 must be reset. This is accomplished by again moving the carriage 23 into its fully rightward position and then mounting a new workpiece upon the carriage 23 in the same manner as set forth above. Thereafter, the counting rod 62 is rotated into its FIGURE 7 position and said rod is moved leftwardly into its position of FIGURE 6. The knob 72 is rotated into its FIGURE 5 position which causes the starting block 106 to again engage the switch 107 whereby the entire polishing operation is initiated and repeated in exactly the same manner as set forth above.

This polishing, grinding or other metal working operation can be performed upon longer or shorter working surfaces simply by adjusting the location of the switch actuators 46 and 47 along the tie bar 27, or by moving the switches 43 and 44 along the rail 16. As indicated above, the number of cycles in a particular grinding operation can be varied simply by changing the location of the stop block 97 from one recess 96 to another.

Although a particular preferred embodiment of the invention has been disclosed in detail above for illustrative purposes, it will be understood that variations or modifications of such disclosure, which lie within the scope of the appended claims are fully contemplated.

What is claimed is:

1. A counting mechanism for a machine having a workpiece-supporting carriage and drive means for moving said carriage along a path, comprising: a counting rod and support means fixed with respect to said machine and slidably supporting said counting rod adjacent to and substantially parallel with said path; means defining a plurality of uniformly spaced abnormalities along said rod near said support means; actuating means mounted upon said support means for movement lengthwise of said rod, said actuating means being engageable with said abnormalities for effecting step-by-step, lengthwise advancement of said rod with respect to said support means, means for operating said actuating means in response to movement of the carriage along said path; and control means on said rod and said support means for detecting and signalling a predetermined number of said advancements.

2. A counting mechanism for a machine having an elongated, substantially horizontal rail, a workpiece-supporting carriage mounted upon said rail and drive means for effecting reciprocable movement of said carriage along said rail, comprising: a counting head fixed with respect to the rail; a rod parallel with said rail and slidably supported upon said head; means defining a plurality of uniformly spaced, radially positioned surfaces spaced lengthwise of said rod near said head; lever means mounted upon said head for movement lengthwise of said rod, said lever means being engageable with said surfaces, one at a time, for effecting step-by-step, lengthwise advancement of said rod with respect to said head; actuating means responsive to movement of said carriage along said rail for effecting said movement of said lever means whereby said rod is advanced with respect to said head; and cooperating control means on said rod and said rail for de-energizing said drive means after a selected number of advancements of said rod.

3. A counting mechanism for a grinding machine having an elongated, substantially horizontal rail, a workpiece-supporting carriage mounted upon said rail and drive means for effecting reciprocable movement of said carriage along said rail, comprising: a housing mounted upon the rail; a rod parallel with and spaced from said rail, said rod being supported upon said housing for movement with respect thereto along and around the lengthwise axis of said rod; means defining a plurality of uniformly and closely spaced radially positioned surfaces arranged lengthwise along said rod near said housing; a bell crank pivotally supported upon said housing for movement around an axis transverse of said rod; a lever supported upon one end of said bell crank and engageable with said surfaces, one at a time; actuating means responsive to movement of the carriage and engageable with the other end of said bell crank for effecting pivotal movement thereof, whereby said lever engages one surface and effects a lengthwise advancement of said rod with respect to said housing; a cam mounted upon said rod and adjustable lengthwise thereof; electromechanical means fixed with respect to said rail and engageable by said cam after a selected number of advancements of said rod; and manually engageable means on said rod for rotating same whereby said radially positioned surfaces are moved out of alignment with said lever and said rod is movable in the opposite lengthwise direction from its advanced position back to its initial position.

4. The structure of claim 3 including a second cam mounted upon said rod and second electromechanical means circumferentially aligned with said second cam when said rod is in said initial position, whereby rotation of said rod for re-aligning said surfaces with said lever effects an engagement of said second cam with second electromechanical means and an energization of said drive means.

5. Control mechanism for a centerless belt grinding machine having a workpiece-supporting carriage mounted for reciprocable movement through the grinding zone, comprising: a startswitch and a stop switch for controlling movement of said carriage; a housing mounted fixedly with respect to said machine; a rod parallel with the direction of movement of said carriage through said grinding zone, said rod being supported upon said housing for movement with respect thereto both along and around its lengthwise axis; means defining a plurality of uniformly spaced radially positioned surfaces arranged lengthwise along said rod near said housing; a pawl reciprocably mounted for engagement with said surfaces and first actuating means pivotally supported upon said housing for effecting reciprocable movement of said pawl; second actuating means responsive to the movement of said carriage and engageable with said first actuating means for effecting pivotal movement thereof whereby said pawl engages one of said surfaces and effects a lengthwise advancement of said rod with respect to said housing; a pair of cams fixed on said rod and in a first rotative position of said rod engageable with both of said switches and in a second rotative position of said rod engageable with neither of said switches, a first of said cams being engageable in said first rotative position with said start switch in one axial position of said rod and the second of said cams being engageable in said first rotative position with said stop switch in another axial position of said rod, and in said first rotative position of said rod said surfaces being engageable by said pawl and in said second rotative position of said rod said surfaces being out of engagement by said pawl; and a manually manipulatable means for rotating and axially sliding said rod, whereby in said second rotative position of said rod said rod may be moved axially into a starting position and will be free from engagement with either of said cams and likewise free from engagement with said pawl, and in said first rotative position of said rod said one cam will engage said start switch in one axial position of said rod and said other cam will engage said stop switch in another axial position of said rod, and said pawl will upon actuation by said second actuating means move said rod stepwise from said one axial position to said another axial position.

6. A counting mechanism for a machine having a workpiece-supporting carriage and drive means for moving said carriage along a path, comprising: a housing mounted in fixed position with respect to said path; an elongated element extending parallel with a portion of said path, said element being supported upon said housing for movement with respect thereto in a direction lengthwise of said element; means on said element defining a rack arranged lengthwise along said element; a reciprocable pawl mounted upon said housing and arranged for engaging said rack and thereby advancing said element lengthwise; actuating means responsive to movement of the carriage for engaging and reciprocating said pawl to thereby cause same to engage said rack and advance said element; a switch and a switch actuator, one of said switch and said switch actuator being mounted upon said element and the other being fixed with respect to said path so that said switch actuator actuates said switch after a selected number of movements of said element; and means for disengaging said rack and said pawl and for moving said element with respect to said housing and with respect to said path whereby said element may be moved from its advanced position back to its original position.

7. A counting mechanism according to claim 6 including a second switch and a second switch actuator, one of said second switch and said second switch actuator being fixed with respect to said path and the other being mounted on said element so that said second switch actuator actuates said second switch when said element is in its original position.

8. A counting mechanism according to claim 7 wherein said element is a rod which is mounted for rotation with respect to said housing, said rack being comprised of a series of axially spaced teeth which are longitudinally aligned along one portion of the circumference of said rod; said switch actuators comprising cams projecting from said rod at selected points on the circumference thereof, said switches being mounted on said housing whereby said cams and said teeth may be moved into and out of positions for engaging said switches and said pawl, repsectively, by rotation of said rod.

9. A counting mechanism for a machine having a workpiece-supporting carriage and drive means for moving said carriage along a path, comprising: a housing and an elongated element parallel with said path and supported on said housing for movement with respect thereto, one of said housing and said element being fixed with respect to said path and the other being movable with respect thereto; means responsive to movement for said carriage along said path for moving said element with respect to said housing from an initial position to an advanced position; a start switch for starting movement of said carriage along said rail and a stop switch for stopping movement of said carriage along said rail, said switches being mounted along said path; means for actuating said start switch when said element is in its initial position; means for actuating said stop switch when said element is in its advanced position; and means for moving said element from its advanced to its initial position independently of the movement of said carriage.

10. Control mechanism for a centerless grinding machine, comprising: a carriage and rail means supporting same for reciprocable movement through a grinding zone; means for automatically effecting reversal of the direction of travel of said carriage at the end of its movement in one direction or the other along said rail means; an elongated rod and means supporting same parallel with the rail means and for lengthwise movement with respect thereto, said rod having a rack arranged lengthwise thereon; a reciprocable pawl engageable with said rack and cam means on said carriage for reciprocating said pawl and thereby advancing said rod when said carriage moves in either direction along said rail means; a start switch and means for actuating said start switch in response to positioning of said rod in one of its terminal positions with respect to said supporting means whereby reciprocation of said carriage is initiated; a stop switch and means for actuating said stop switch in response to positioning of said rod in its other terminal position with respect to said supporting means whereby reciprocation of said carriage is terminated.

References Cited in the file of this patent

UNITED STATES PATENTS

| | | |
|---|---|---|
| 1,714,475 | Jaeger | May 21, 1929 |
| 1,908,626 | Ford | May 9, 1933 |
| 2,270,590 | Johnson | Jan. 20, 1942 |
| 2,648,234 | Lester | Aug. 11, 1953 |
| 2,750,582 | Anderson | June 12, 1956 |